United States Patent
Ishikawa (10) Patent No.: US 11,368,388 B2
(45) Date of Patent: Jun. 21, 2022

(54) COMMUNICATION SYSTEM, COMMUNICATION DEVICE, AND COMMUNICATION METHOD

(71) Applicant: TOSHIBA TEC KABUSHIKI KAISHA, Tokyo (JP)

(72) Inventor: Hiroyuki Ishikawa, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/329,329

(22) Filed: May 25, 2021

(65) Prior Publication Data
US 2022/0052940 A1    Feb. 17, 2022

(30) Foreign Application Priority Data
Aug. 11, 2020 (JP) .............................. JP2020-135778

(51) Int. Cl.
*H04L 45/00* (2022.01)
*H04W 84/18* (2009.01)

(52) U.S. Cl.
CPC .............. *H04L 45/20* (2013.01); *H04W 84/18* (2013.01)

(58) Field of Classification Search
CPC ......... H04L 41/12; H04L 45/02; H04L 45/70; H04L 45/12; H04L 45/22; H04L 43/08; H04L 43/0852; H04L 41/16; H04L 41/5025; H04L 45/123; H04L 45/24; H04L 47/122; H04L 47/365; H04L 41/142; H04L 45/48; H04L 43/16; H04L 45/00; H04L 41/147; H04L 45/28; H04L 45/42; H04L 45/46; H04L 12/4633; H04L 12/66; H04L 43/0876; H04L 43/10; H04L 45/04;

(Continued)

(56) References Cited

U.S. PATENT DOCUMENTS

| 9,999,090 B2 | 6/2018 | Turon et al. |
| 2010/0185753 A1* | 7/2010 | Liu ..................... H04L 65/4084 709/219 |

(Continued)

FOREIGN PATENT DOCUMENTS

WO    2015200558 A1    12/2015

OTHER PUBLICATIONS

Extended European Search Report dated Dec. 20, 2021, mailed in counterpart European Application No. 21183552.5, 13 pages.

*Primary Examiner* — Djenane M Bayard
(74) *Attorney, Agent, or Firm* — Kim & Stewart LLP (57) ABSTRACT

A communication system includes a server and multiple communication nodes. The server broadcasts a mesh network entry request to the communication nodes. Each communication node is configured to receive the mesh network entry request, cause a mesh network entry request to hop to the other communication nodes if the entry request is not addressed to the node itself, register a rank of the node based on a number of hops required for the entry request to reach the node if the entry request is addressed to the communication node, transmit a rank request when the communication node registers its rank, receive a rank response from other nodes, each rank response including a rank of the node sending the rank response, and register the node having a highest ranking response as a communication path to the server if its rank is higher than the node itself.

18 Claims, 6 Drawing Sheets

(58) Field of Classification Search
CPC ....... H04L 45/124; H04L 45/16; H04L 45/20; H04L 45/64; H04L 45/66; H04L 67/10; H04L 67/104; H04L 67/16; H04L 12/2803; H04L 1/1867; H04L 41/0654; H04L 41/0806; H04L 41/145; H04L 43/0823; H04L 43/0847; H04L 45/122; H04L 45/125; H04L 45/127; H04L 45/302; H04L 45/52; H04L 47/125; H04L 61/1511; H04L 63/02; H04L 67/1002; H04L 67/1004; H04L 67/12; H04L 67/327; H04L 12/12; H04L 12/1457; H04L 12/1478; H04L 12/18; H04L 12/1813; H04L 12/28; H04L 12/2879; H04L 12/44; H04L 12/4625; H04L 2209/38; H04L 2209/56; H04L 29/06993; H04L 29/08027; H04L 29/08306; H04L 41/044; H04L 41/0663; H04L 41/0668; H04L 41/0677; H04L 41/0816; H04L 41/082; H04L 41/0836; H04L 41/0886; H04L 41/0896; H04L 41/14; H04L 41/5003; H04L 41/5009; H04L 41/5019; H04L 41/5054; H04L 43/04; H04L 43/045; H04L 43/06; H04L 43/065; H04L 43/0805; H04L 43/0817; H04L 43/0864; H04L 43/0882; H04L 43/0894; H04L 43/106; H04L 43/14; H04L 43/50; H04L 45/06; H04L 45/121

See application file for complete search history.

(56) References Cited

U.S. PATENT DOCUMENTS

| | | | |
|---|---|---|---|
| 2011/0202651 A1* | 8/2011 | Hilt | H04L 67/1063 709/224 |
| 2012/0142285 A1 | 6/2012 | Tsuchida et al. | |
| 2015/0334629 A1 | 11/2015 | Patil et al. | |
| 2016/0062933 A1 | 3/2016 | Kanomata | |
| 2016/0212698 A1* | 7/2016 | Guo | H04W 52/0261 |
| 2018/0123941 A1* | 5/2018 | Flamini | H04L 45/124 |
| 2018/0211238 A1 | 7/2018 | Ishikawa et al. | |
| 2020/0084689 A1 | 3/2020 | Arvidson et al. | |

* cited by examiner

| PREAMBLE | HEADER | | | | | | ARBITRARY | CRC |
|---|---|---|---|---|---|---|---|---|
| | DATA LENGTH | HEADER PART | | | | | PAYLOAD PART | CRC |
| | | DATA TYPE | TRANSMISSION SOURCE ADDRESS | DESTINATION ADDRESS | START ADDRESS | END ADDRESS | RELAY PART | DATA PART |
| | | | | | | | RELAY ADDRESS | DATA |
| 4 BYTES | 2 BYTES | 1 BYTE | X BYTES | X BYTES | X BYTES | X BYTES | XX BYTES | XXXX BYTES | 2 BYTES |

COMMUNICATION SYSTEM, COMMUNICATION DEVICE, AND COMMUNICATION METHOD

CROSS-REFERENCE TO RELATED APPLICATION

This application is based upon and claims the benefit of priority from Japanese Patent Application No. 2020-135778, filed Aug. 11, 2020, the entire contents of which are incorporated herein by reference.

FIELD

Embodiments described herein relate generally to a communication system, a communication device, and a communication method.

BACKGROUND

A mesh network is constructed between nodes and information is gathered at a server, which is the center of the mesh network. For example, when constructing a mesh network, each node registers the address of the server in advance. When the power of a node is turned on, the node sends out a communication path search signal and subsequently a communication path to the server is established.

Devices, such as a keyboard, a touch scanner, or a printer, that might not have a user interface, and it may not be simple input the address of the server for connecting such a device. Therefore, such a device needs to store the address of the server in advance.

However, if the server in the mesh network needs to be changed, the address of the server that was previously registered in the various devices needs to be changed. However, changing the address of the server is not easy.

DETAILED DESCRIPTION

An embodiment described herein provides a mesh network that can be simply constructed and maintained.

In general, according to one embodiment, a communication system includes a plurality of communication nodes and a server. The server is configured to store addresses for each of the plurality of communication nodes in a memory unit, and broadcast a mesh network entry request to the plurality of communication nodes based on the addresses stored in the memory unit. Each communication node is configured to receive the mesh network entry request; cause a mesh network entry request to hop by broadcasting the mesh network entry request to the other communication nodes if a destination address of the mesh network entry request is not the address of the communication node itself; register a rank of the communication node itself based on a number of hops required for a mesh network entry request to reach the communication node itself if a destination address of the mesh network entry request is the address of the communication node; transmit a rank request based on the registration of the rank of the communication node itself; receive a rank response from one or more of the other communication nodes in response to the transmitted rank request, each rank response from another one of the communication nodes including a rank of the particular communication node transmitting the rank response; and register a communication node having a highest ranking rank response as a communication path to the server if the rank of the communication node sending the highest ranking rank response is higher than the rank of the communication node that transmitted the rank request.

A communication system according to an example embodiment will now be described with reference to the drawings. In the drawings used for the description of the embodiment below, some configurations may be omitted for the sake of simplifying description of relevant aspects. In the drawings and the specification, the same reference sign represents the same element.

Figure 1:
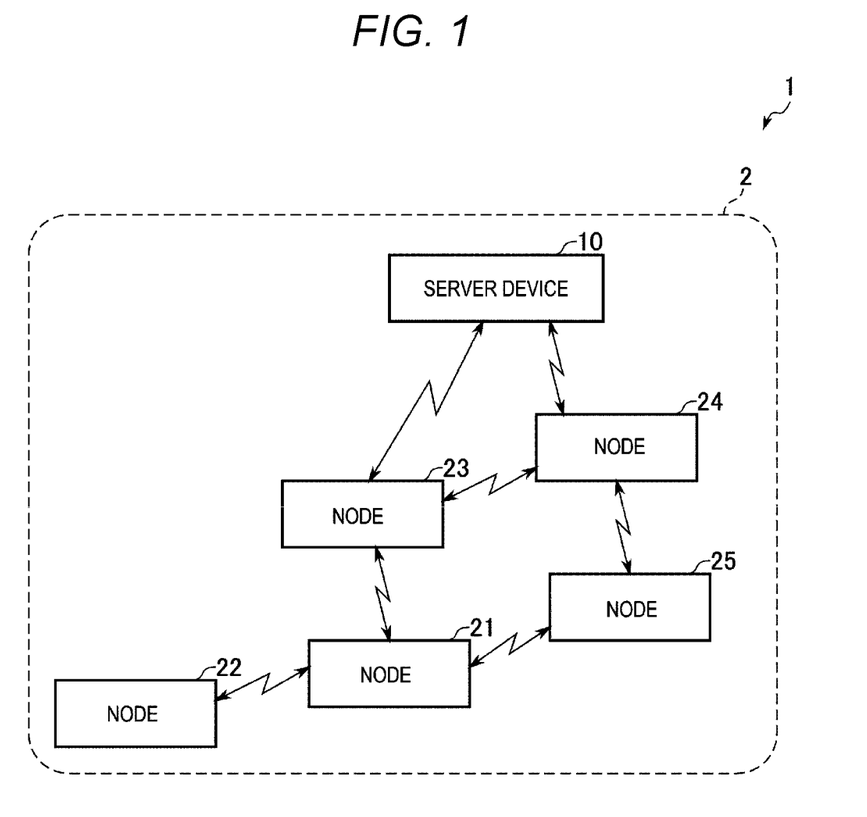
FIG. 1 shows an outline of a communication system according to an embodiment.

FIG. 1 shows an outline of a communication system 1 according to an embodiment.

The communication system 1 includes a server device 10 and a plurality of nodes 21 to 25 (21, 22, 23, 24, 25). The server device 10 and the nodes 21 to 25 form a mesh network 2. The mesh network 2 is a multi-hop network. Each of the nodes 21 to 25 communicates with the server device 10 via one or a plurality of the other nodes or directly (that is, not via any other nodes). That is, each of the nodes 21 to 25 can communicate with the server device 10 by multi-hopping techniques or directly. Each of the nodes 21 to 25 also functions as a repeater in multi-hop communication. While FIG. 1 shows five nodes, the number of nodes is not limited to five.

Figure 2:
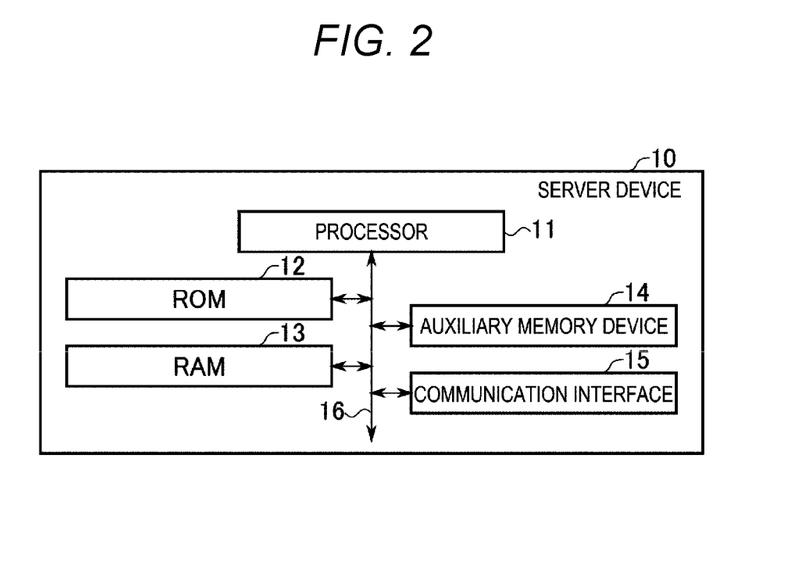
FIG. 2 is a block diagram of aspects of a server device.

FIG. 2 is a block diagram showing an example of the configuration of a server device 10.

The server device 10 is a server that manages and controls the mesh network 2.

In an example, the server device 10 includes a processor 11, a ROM (read-only memory) 12, a RAM (random-access memory) 13, an auxiliary memory device 14, and a communication interface 15. A bus 16 or the like connects these components together.

The processor 11 is or is equivalent to the central processing unit (CPU) of a computer and is used for performing processing such as computation and control that are necessary for the server device 10 to operate. The processor 11 controls sub-components so as to implement various functions of the server device 10, based on programs such as firmware, system software, and application software stored in the ROM 12, the auxiliary memory device 14 or the like. The processor 11 executes processing based on these programs. In some examples, a part or all of the functionality of the programs may be built into a circuit of the processor 11. The processor 11 can be, for example, a CPU (central processing unit), an MPU (micro processing unit), an SoC (system on a chip), a DSP (digital signal processor), a GPU (graphics processing unit), an ASIC (application-specific integrated circuit), a PLD (programmable logic device) or an FPGA (field-programmable gate array) or the like. Alternatively, the processor 11 may be a combination or a plurality of these units.

The ROM 12 is a non-volatile memory. The ROM 12 stores, for example, firmware or the like. The ROM 12 also stores data, parameters, settings or the like to be used by the processor 11 to perform various kinds of processing.

The RAM 13 is used for reading and writing data. The RAM 13 is used as a work area for temporarily storing data to be used by the processor 11 to perform various kinds of processing, or the like. The RAM 13 is typically a volatile memory.

The auxiliary memory device 14 is, for example, an EEPROM® (electrically erasable programmable read-only memory), an HDD (hard disk drive) or a flash memory or the like. The auxiliary memory device 14 stores, for example, system software or application software or the like. The auxiliary memory device 14 also stores data and the like used by the processor 11 to perform various kinds of processing, as well as data and various parameter values generated by the processing by the processor 11, or the like.

For example, the auxiliary memory device 14 stores the addresses of the plurality of nodes for forming the mesh network 2. Here, in this particular example, it is assumed that the auxiliary memory device 14 stores the addresses of the nodes 21 to 25. The addresses of the nodes 21 to 25 can be saved in the auxiliary memory device 14 based on a user input operation or the like. The auxiliary memory device 14 is an example of a memory unit.

The communication interface 15 permits the server device 10 to communicate wirelessly. The communication interface 15 includes a circuit and an antenna or the like for wireless communication.

The bus 16 includes a control bus, an address bus, and a data bus or the like, and transmits signals between each sub-part of the server device 10.

Figure 3:
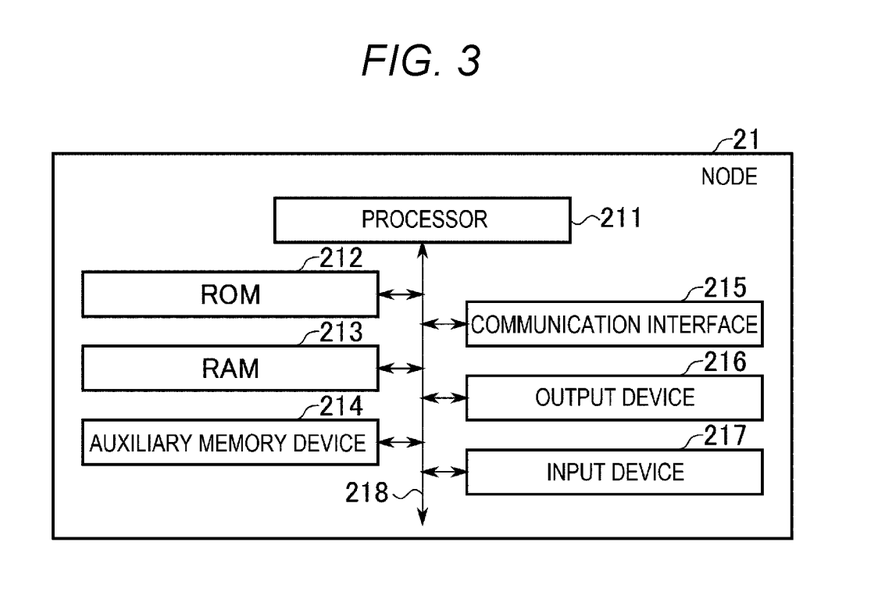
FIG. 3 is a block diagram of aspects of a node.

FIG. 3 is a block diagram showing an example of the configuration of a node 21.

The node 21 can be any one of various devices having a wireless communication function, such as a PC (personal computer), a tablet PC, a smartphone, a game machine, an industrial machine, a POS (point of sale) terminal, a printer, a communication device, and an IoT (internet of things) device. In this particular example, node 21 can be such a device without a user interface permitting the entry of a server address or the like but having a wireless communication function. For example, node 21 may be a keyboard, a touch scanner, and a printer. While the node 21 is described as a representative example of the nodes 21 to 25 and nodes 22 to 25 are configured similarly to node 21.

The node 21 includes a processor 211, a ROM 212, a RAM 213, an auxiliary memory device 214, a communication interface 215, an output device 216, and an input device 217. A bus 218 or the like connects these components together. The node 21 is an example of a communication node. The node 21 is also an example of a communication device.

The processor 211 is or is equivalent to the central processing unit (CPU) of a computer for performing processing such as computation and control that are necessary for the node 21 to operate. The processor 211 controls each sub-part so as to implement various functions of the node 21, based on programs such as firmware, system software, and application software stored in the ROM 212 or the auxiliary memory device 214 or the like. The processor 211 executes processing based on these programs. A part or all of the functions of such programs may be built in as a circuit in the processor 211. The processor 211 is, for example, a CPU, an MPU, an SoC, a DSP, a GPU, an ASIC, a PLD or an FPGA or the like. Alternatively, the processor 211 may be a combination or a plurality of these units.

The ROM 212 is a non-volatile memory. The ROM 212 stores, for example, firmware or the like. The ROM 212 may also store data, parameters, setting values or the like used by the processor 211 to perform various kinds of processing.

The RAM 213 is used to read and write data. The RAM 213 is used as a work area for temporarily storing data to be used by the processor 211 to perform various kinds of processing, or the like. The RAM 213 is typically a volatile memory.

The auxiliary memory device 214 is, for example, an EEPROM, an HDD or a flash memory or the like. The auxiliary memory device 214 stores, for example, system software, application software or the like. The auxiliary memory device 214 stores data used by the processor 211 to perform various kinds of processing, and data and various parameter values generated by the processing by the processor 211, or the like.

The communication interface 215 is for the node 21 to communicate wirelessly. The communication interface 215 includes a circuit and an antenna or the like for wireless communication.

The output device 216 displays a screen for notifying the operator (user) of the node 21 of various information. The output device 216 is, for example, a display screen such as a liquid crystal display or an organic EL (electroluminescence) display.

The input device 217 accepts an input operation by the operator of the node 21. The input device 217 is, for example, a keyboard, a keypad, a touchpad, a mouse or the like. Also, a touch panel can be used as the output device 216 and the input device 217. That is, a display panel provided on the touch panel can be used as the output device 216. A touch input-based pointing device provided on the touch panel can be used as the input device 217. The output device 216 and the input device 217 may not be included in the node 21, depending on the type of the node 21.

The bus 218 includes a control bus, an address bus, and a data bus or the like, and transmits a signal transmitted and received by each part of the node 21.

Operations of the communication system 1 according to an embodiment will now be described. The content of processing in the description of the operations below is simply an example for purposes of explanation of certain aspects. Various kinds of processing that can achieve similar results can be suitably used.

First, processing related to a mesh network entry request is described.

The mesh network entry request is a request for entry into a mesh network for a node that has not entered the mesh network yet. The mesh network entry request may also be referred to as a mesh network entry request message or a mesh network entry request signal. In the description below, the mesh network entry request is also referred to more simply as an entry request.

Figure 4:
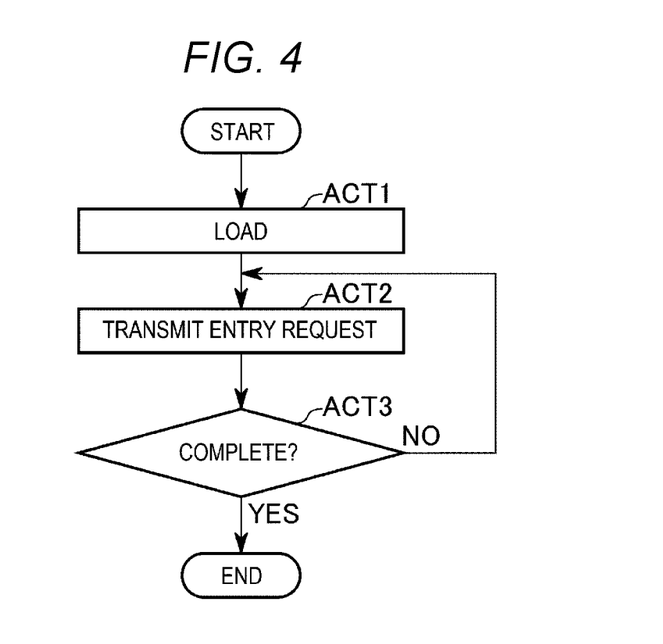
FIG. 4 is a flowchart showing an example of mesh network entry request transmission processing by a server device.

FIG. 4 is a flowchart showing an example of entry request transmission processing by the server device 10.

The server device 10 performs the entry request transmission processing when forming a mesh network.

The processor 11 executes this processing, based on the program stored in the ROM 12 or the auxiliary memory device 14 or the like.

The processor 11 loads the addresses of the nodes (ACT 1). In ACT 1, for example, the processor 11 loads the addresses of the nodes 21 to 25 stored in the auxiliary memory device 14 onto the RAM 13.

The processor 11 broadcasts an entry request to the nodes 21 to 25, based on the addresses of the nodes 21 to 25 (ACT 2). In ACT 2, for example, the processor 11 individually broadcasts an entry request, using the address of each of the plurality of nodes 21 to 25 as a destination, via the communication interface 15. The processor 11 sets the address of each of the nodes 21 to 25 as an end address of an entry request. The end address is the address of a final target device. The end address corresponds to the address of a destination (a destination address). In some examples, the communication interface 15 broadcasts an entry request. The processor 11 performs the processing of ACT 2 and thus functions as a transmission unit. The transmission unit whose function is implemented by the processor 11 in ACT 2 is also referred to as a first transmission unit.

The processor 11 determines whether the transmission of the entry request using the address of each of the nodes 21 to 25 as the destination is complete or not (ACT 3). In ACT 3, for example, the processor 11 can determine whether the transmission of the entry request is complete or not, based on whether there remains an address to which the entry request remains unsent from among all the addresses loaded on the RAM 13. If the transmission of the entry requests is not complete (NO in ACT 3), the processor 11 repeats the processing of ACT 2. If the transmission of the entry requests is complete (YES in ACT 3), the processor 11 ends the processing.

Figure 5:
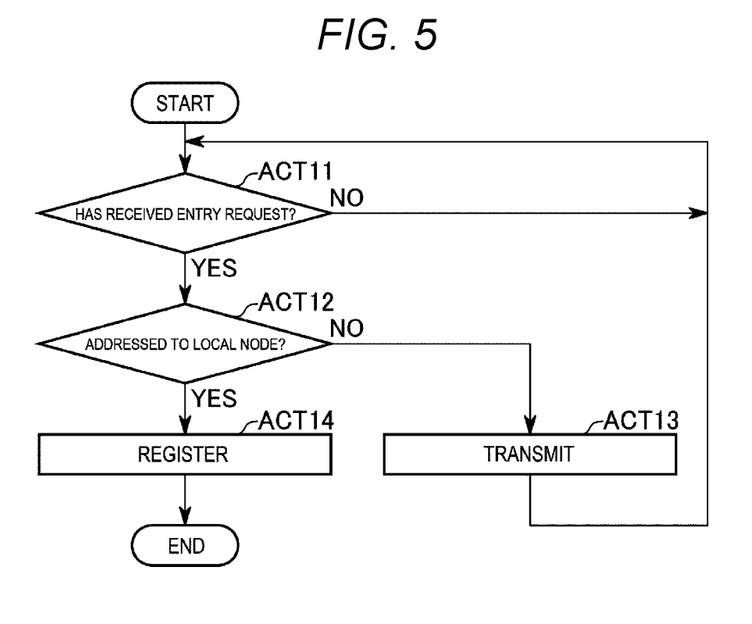
FIG. 5 is a flowchart showing an example of mesh network entry request reception processing by a node.

FIG. 5 is a flowchart showing an example of entry request reception processing by the node 21.

While the description here is about the node 21, the nodes 22 to 25 operate similarly.

The processor 211 executes this processing, based on the program stored in the ROM 212 or the auxiliary memory device 214 or the like.

The processor 211 receives an entry request (ACT 11). In ACT 11, for example, the processor 211 receives an entry request transmitted from the server device 10, via the communication interface 215. The entry request may directly reach the node 21 from the server device 10 or may be relayed from the server device 10 by one or more other nodes. It can also be said that the communication interface 215 receives the entry request. The processor 211 performs the processing of ACT 11 and thus functions as a reception unit. The reception unit whose function is implemented by the processor 211 in ACT 11 is also referred to as a first reception unit.

If the processor 211 has not received an entry request (NO in ACT 11), the processor 211 waits for an entry request. In response to the reception of an entry request (YES in ACT 11), the processor 211 determines whether the destination of the entry request is the local node (in this instance, node 21 itself) or not (ACT 12). In ACT 12, for example, the processor 211 compares the end address that is set in the entry request with the address of the local node. Here, the local node is the node 21. If the end address is the address of the local node, the processor 211 determines that the destination of the entry request is the local node. However, if the end address is not the address of the local node, the processor 211 determines that the destination of the entry request is not the local node.

If the entry request is not for the local node (NO in ACT 12), the processor 211 causes the entry request to hop by broadcasting (ACT 13). In ACT 13, the processor 211 causes the received entry request to hop by broadcasting via the communication interface 215. Causing a hop is equivalent in this context to relaying the received entry request to another node. It can also be said that the communication interface 215 broadcasts the previously received entry request. In an example, the processor 211 may change information stored in the entry request about the number of hops the entry request has made. The number of hops is the number of nodes between which the entry request has been transmitted from the server device 10. Here, the processor 211 changes the information about the number of hops by adding one to the stored number of hops. Thus, each node can determine the number of hops that have been made before the entry request reaches the local node. In another example, the processor 211 may store, in the entry request, the address information for the local node (node 21 in this instance) as the address of a node through which the entry request has hopped. The entry request stores the address information of all the nodes, based on the storing of the address information by each of all the nodes over which the entry request transmitted from the server device 10 hops. Thus, each node can determine the number of hops made until the entry request reaches the local node. The processor 211 performs the processing of ACT 13 and thus functions as a transmission unit. The transmission unit whose function is implemented by the processor 211 in ACT 13 is also referred to as the first transmission unit.

If the destination of the entry request is the local node (YES in ACT 12), the processor 211 registers the rank of the local node based on the number of hops by the entry request (ACT 14). In ACT 14, the processor 211 determines the number of hops by the entry request. In an example, the processor 211 determines the number of hops that were made before the entry request reached the node 21 based on the information about the number of hops stored in the entry request. In another example, the processor 211 may determine the number of hops made before the entry request reached the node 21 based on the address information for the nodes through which the entry request passed/hopped as stored in the entry request.

The processor 211 decides the rank of the local node based on the number of hops thus determined. The rank of a node is a value corresponding to the number of other nodes via which the data communication between the local node and the server device 10 is carried out.

As the number of other nodes through which the data communication between the local node and the server device 10 must be carried out increases, the rank of the local node is set to be a greater value. Here, the processor 211 decides the rank of the local node as the value of the number of required hops plus one. For example, if the number of hops is 0 (the entry request directly reaches the node 21 from the server device 10), the rank is 1. That is, the node 21 can have data communications with the server device 10 without a relay by any other nodes.

If the number of hops is 1, the entry request is relayed from the server device 10 by one other node before it reaches the node 21. In this case, the rank of node 21 is 2. That is, the node 21 can have data communications with the server device 10 with a relay by one other node. If the number of hops is 2 or more, a similar ranking process takes place. The processor 211 registers the rank of the local node thus decided. The processor 211 saves the registered rank of the local node into the auxiliary memory device 214.

Here, it is assumed that the node 21 has received an entry request addressed to the node 21 as the destination by hopping via the node 24 and the node 25 in this order. It is assumed that, in ACT 14, the processor 211 has determined that the number of hops is "2" and that the rank of the local node (node 21) is "3". It is assumed that the processor 211 has registered the rank "3" of the local node.

The processor 211 also registers the address of the server device 10 set as a start address of the entry request. The start address is the address of a transmission source. The processor 211 saves the registered address of the server device 10 into the auxiliary memory device 214. The processor 211 performs the processing of ACT 14 and thus functions as a registration unit. The registration unit whose function is implemented by the processor 211 in ACT 14 is also referred to as a first registration unit.

Processing related to a rank request will now be described.

The rank request is a request for a ranking in relation to other nodes. The rank request may also be referred to as a rank request message, a rank request signal or a path search signal. For example, the rank request can be a beacon signal.

Figure 6:
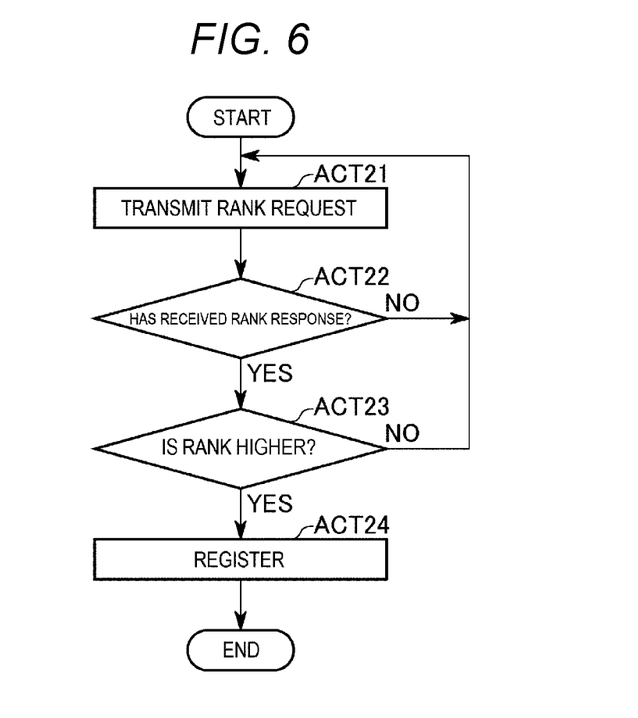
FIG. 6 is a flowchart showing an example of rank request transmission processing by a node.

FIG. 6 is a flowchart showing an example of rank request transmission processing by representative node 21.

The processor 211 executes this processing, based on the program stored in the ROM 212 or the auxiliary memory device 214 or the like.

The processor 211 transmits a rank request (ACT 21). In ACT 21, the processor 211 transmits a rank request via the communication interface 215 based on the registration of the rank of the local node in ACT 14, for example. It can also be said that the communication interface 215 transmits the rank request. The processor 211 performs the processing of ACT 21 and thus functions as a transmission unit. The transmission unit whose function is implemented by the processor 211 in ACT 21 is also referred to as a second transmission unit.

The processor 211 of the local node receives a rank response from one or more other nodes (ACT 22). In ACT 22, for example, the processor 211 receives a rank response from one or more of the nodes 22 to 25 via the communication interface 215. The rank response is a response to a rank request and includes the rank of the other node sending the rank response. Here, it is assumed that the node 21 is the local node and that the nodes 22 to 25 are the one or more other nodes. For example, a rank response from the node 22 is a response including the rank of the node 22. It can also be said that the communication interface 215 receives the rank response. The processor 211 performs the processing of ACT 22 and thus functions as a reception unit. The reception unit whose function is implemented by the processor 211 in ACT 22 is also referred to as a second reception unit.

If the processor 211 has not received a rank response (NO in ACT 22), the processor 211 continues the processing of ACT 21. In response to the processor 211 having received a rank response (YES in ACT 22), the processing shifts from ACT 22 to ACT 23. Here, it is assumed that the node 23 has transmitted a rank response including the rank "1" to the node 21 as a rank response to the rank request from the node 21. It is assumed that the node 25 has transmitted a rank response including the rank "2" to the node 2, as a rank response to the rank request from the node 21. It is assumed that the node 22 has transmitted a rank response including the rank "4" to the node 21 as a rank response to the rank request from the node 21. It is assumed that the node 24 has not received the rank request from the node 21 and therefore has not transmitted a rank response to the node 21.

The processor 211 determines whether any of the ranks of the one or more other nodes that have transmitted a rank response is higher than the registered rank of the local node (ACT 23). In ACT 23, the processor 211 acquires the ranks of the other nodes from the rank response(s). The processor 211 compares the rank of the local node with the rank of the other nodes that have transmitted a rank response. The processor 211 determines whether any of the other nodes is higher in rank than the local node. If none of the ranks of the other nodes is higher than the rank of the local node (NO in ACT 23), the processor 211 continues the processing of ACT 21. In response to the determination that there is a higher rank than the rank of the local node among the ranks of the other nodes (YES in ACT 23), the processing shifts from ACT 23 to ACT 24.

The processor 211 registers the other node with the highest rank of those that are higher than the rank of the local node as a communication path between the local node and the server device 10 (ACT 24). In ACT 24, for example, the processor 211 extracts the highest rank of the node(s) that rank higher of the local node from among the ranks of the other nodes included in the individual rank responses. The node of the highest rank is extracted in order to reduce the number of nodes via which the data communication between the local node and the server device 10 must be carried out. The extracted node of the highest rank may be the same as the transmission source of the entry request addressed to and received by the node 21 or may not be this transmission source. In the latter case, the node 21 may not have been able to receive an entry request addressed to the node 21 from the extracted other node of the highest rank. However, the node 21 can still transmit a rank request and receive a rank response to and from the other node of the highest rank. This is because broadcasting an entry request increases the amount of traffic and may disable communication between nodes that could otherwise be carried out. The extracted other node of the highest rank is a node via which the data communication between the local node and the server device can be carried out and which can directly have data communications to and from the local node. Therefore, the extracted other node of the highest rank serves as a communication path between the local node and the server device 10. The processor 211 registers the extracted other node of the highest rank as a communication path between the local node and the server device 10. The processor 211 saves the address of this other node as a communication path between the local node and the server device 10 into the auxiliary memory device 214. The processor 211 performs the processing of ACT 23 and thus functions as a registration unit. The registration unit whose function is implemented by the processor 211 in ACT 23 is also referred to as a second registration unit.

For example, in ACT 24, the processor 211 extracts the highest rank "1" from the ranks that are higher than the registered rank "3" of the local node from among the rank "1" of the node 23, the rank "2" of the node 25, and the rank "4" of the node 22. The processor 211 registers the node 23 of the extracted highest rank "1" as a communication path between the local node and the server device 10. The processor 211 acquires the address of the node 23 from the rank response. The processor 211 saves the address of the node 23 into the auxiliary memory device 214.

In ACT 24, the processor 211 also corrects the rank of the local node registered in ACT 14 based on the extracted highest rank. For example, the processor 211 corrects the rank of the local node registered in ACT 14 to have a rank one less than the extracted highest rank. The processor 211 registers the corrected rank for the local node. The processor 211 saves the registered rank of the local node into the auxiliary memory device 214. The purpose of this process is to enable the latest rank of the local node to be included in a rank response. For example, the processor 211 corrects the rank "3" of the local node registered in ACT 14 to "2", based on the extracted highest rank "1" of responding nodes to a rank request. The processor 211 registers the corrected rank "2" of the local node. The processor 211 saves the registered rank "2" of the local node into the auxiliary memory device 214. The processor 211 may not always need to correct the rank of the local node registered in ACT 14 depending on the value of the extracted highest rank and the local node rank.

Figure 7:
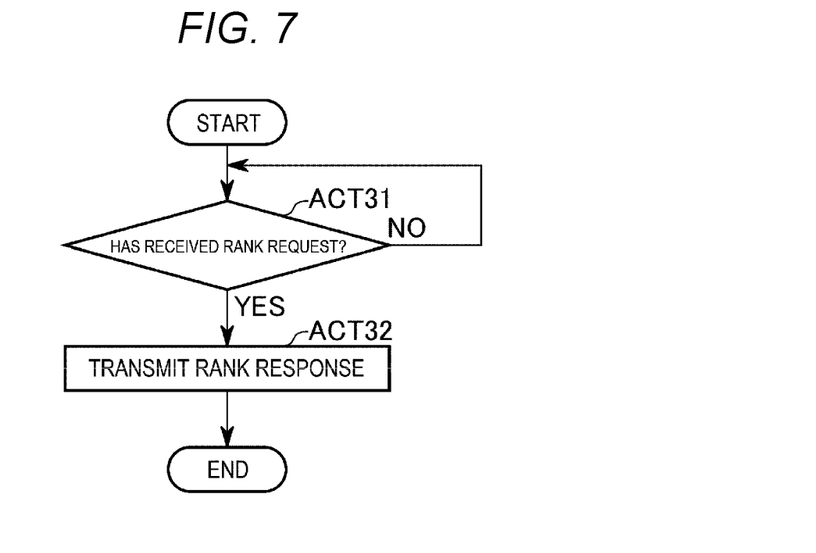
FIG. 7 is a flowchart showing an example of rank request reception processing by a node.

FIG. 7 is a flowchart showing an example of rank request reception processing by a node.

While the description here is about the node 21 as an example, the nodes 22 to 25 operate similarly.

The processor 211 executes this processing, based on the program stored in the ROM 212 or the auxiliary memory device 214 or the like.

The processor 211 receives a rank request (ACT 31). In ACT 31, the processor 211 receives a rank request from one of the nodes 22 to 25 via the communication interface 215. It can also be said that the communication interface 215 receives the rank request. The processor 211 performs the processing of ACT 31 and thus functions as a reception unit. The reception unit whose function is implemented by the processor 211 in ACT 31 is also referred to as a third reception unit.

If the processor 211 has not received a rank request (NO in ACT 31), the processor 211 waits for a rank request. In response to the reception of a rank request (YES in ACT 31), the processor 211 transmits a rank response (ACT 32). In ACT 32, the processor 211 acquires the registered rank of the local node from the auxiliary memory device 214, for example. The processor 211 transmits, via the communication interface 215, a rank response including the rank of the node 21 to the node that has transmitted the rank request. It can also be said that the communication interface 215 transmits the rank response. The processor 211 performs the processing of ACT 32 and thus functions as a transmission unit. The transmission unit whose function is implemented by the processor 211 in ACT 32 is also referred to as a third transmission unit.

Processing related to a path request will now be described.

The path request is a request for information about a communication path between a node and the server device 10. The information about the communication path is information about a node that serves as, or a part of, the communication path between the node and server device 10. For example, the information about the node that serves as the communication path is the address of the node. If a node can have data communications with the server device 10 directly without any other node, the information about the communication path is the address of the local node, which serves as the communication path in this instance. If a node can have data communications with the server device 10 via one or more other nodes, the information about the communication path is the address of the local node and the address(es) of the one or more other nodes which make up the communication path to the server device 10. The path request may also be referred to as a path request message or a path request signal.

Figure 8:
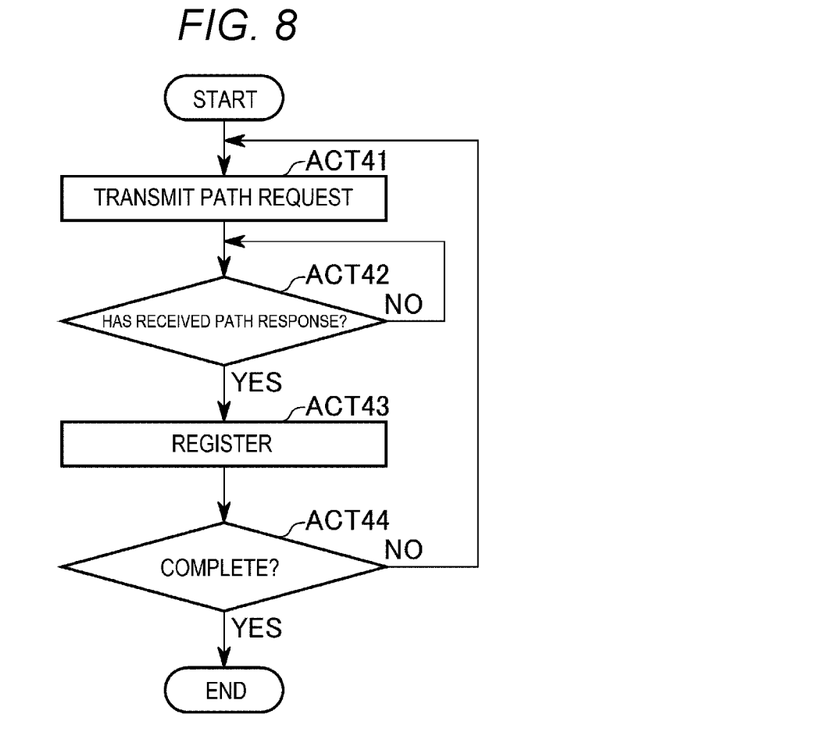
FIG. 8 is a flowchart showing an example of path request transmission processing by a server device.

FIG. 8 is a flowchart showing an example of path request transmission processing by the server device 10.

The processor 11 executes this processing, based on the program stored in the ROM 12 or the auxiliary memory device 14 or the like.

The processor 11 transmits a path request to the nodes 21 to 25 based on the addresses of the nodes 21 to 25 (ACT 41). In ACT 41, for example, the processor 11 broadcasts a path request, via the communication interface 15, using the address of each of the nodes 21 to 25 as a destination. The processor 11 sets the address of each of the nodes 21 to 25 as an end address of a path request. It can also be said that the communication interface 15 broadcasts the path request. The processor 11 performs the processing of ACT 41 and thus functions as a transmission unit. The transmission unit whose function is implemented by the processor 11 in ACT 41 is also referred to as the second transmission unit.

The processor 11 receives a path response (ACT 42). In ACT 42, the processor 11 receives, for example, a path response from each of the nodes 21 to 25 via the communication interface 15. The path response is a response to a path request and includes information about a communication path between the responding node and the server device 10.

Here, the path response from the node 21 is described. In response to the reception of a path request addressed to the node 21, the node 21 transmits a path response, for example, as described below. The node 21 sets the address of the node 21 as a transmission source address for the path response. The transmission source address is the address of a device that actually generates and transmits a packet in response to the path request. The node 21 sets the address of the node 23 as a destination address of the path response. The destination address in this context is the address of a destination device to which a packet is actually transmitted in the first instance. Here, the address of the node 23 is saved in the auxiliary memory device 214 as the communication path between the local node (node 21) and the server device 10. The node 21 sets the address of the node 21 as the start address for the path response. The node 21 sets the address of the server device 10 as the end address for the path response. The address of the server device 10 is saved in the auxiliary memory device 214 by the processing of ACT 14. The node 21 stores the address of the node 21, which is the local node, as the information about the communication path between the node 21 and the server device 10 included in the path response.

The path response transmitted from the node 21 is received by the node 23. In response to the reception of the path response from the node 21, the node 23 causes the path response to hop to the server device 10. The node 23 sets the address of the node 23 as the transmission source address of the path response. The node 23 sets the address of the server device 10 as the destination address of the path response. This is because the node 23 stores the address of the server device 10 as the communication path between the local node (now node 23) and the server device 10. However, the start address of the path response is unchanged, that is, the address of the node 21 is maintained. The end address of the path response is also unchanged, that is, the address of the server device 10 is maintained. The node 23 stores the address of the node 23, which is now the local node, as the information about the communication path between the node 21 and the server device 10 included in the path response. Thus, the information about the communication path between the node 21 and the server device 10 includes the address of the node 21 and the address of the node 23 in order corresponding to the communication path from the node 21 to the server device 10.

The processor 11 of the server device 10 receives, from the node 23, the path response initially transmitted from the node 21. The path response from each of the nodes 22 to 25 operates similarly. The processor 11 performs the processing of ACT 42 and thus functions as a reception unit.

If the processor 11 has not received a path response (NO in ACT 42), the processor 11 waits for a path response. If a path response is received (YES in ACT 42), the processing shifts from ACT 42 to ACT 43.

The processor 11 registers the communication path between the nodes and the server device 10 based on the received information about the communication path (ACT 43). In ACT 43, the processor 11 registers the communication path between a node and the server device 10 based on the information about the communication path included in the path response from the node.

Here, the path response from the node 21 is described. The processor 11 acquires information about the communication path between the node 21 and the server device 10 from the path response initially transmitted from the node 21. The processor 11 acquires the address of the node 21 and the address of the node 23 in an order corresponding to the communication path toward the server device 10.

The processor 11 registers an order (the node path order), as viewed from the server device 10 (so, in order of node 23 to node 21), and the address of the node 23 and the address of the node 21, as the communication path between the node 21 and the server device 10. The processor 11 saves the information about the communication path between the node 21 and the server device 10 into the auxiliary memory device 14.

Similarly, the processor 11 registers information about the communication path between each of the nodes 22 to 25 to the server device 10 and saves the information about the respective communication paths into the auxiliary memory device 14. The processor 11 performs the processing of ACT 43 and thus functions as a registration unit. Thus, the server device 10 can gather the communication path between each of the nodes 21 to 25 and the server device 10.

The processor 11 determines whether the transmission of the path request using the address of each of the plurality of nodes 21 to 25 as the destination is complete or not (ACT 44). In ACT 44, for example, the processor 11 can determine whether the transmission of the path request is complete or not, based on whether there remains an address to which a path request remains unsent in the addresses loaded on the RAM 13. If the transmission of the path requests is not complete (NO in ACT 44), the processor 11 repeats the processing of ACT 41. If the transmission of the path requests is complete (YES in ACT 44), the processor 11 ends the processing.

Figure 9:
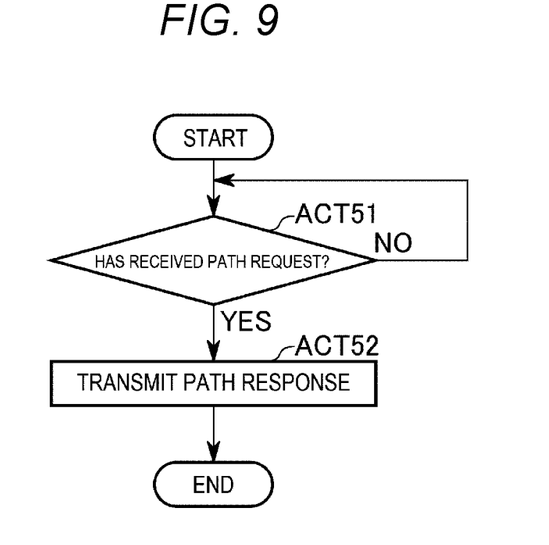
FIG. 9 is a flowchart showing an example of path request reception processing by a node.

FIG. 9 is a flowchart showing an example of path request reception processing by a node.

While the description here is about the node 21 as an example, the nodes 22 to 25 operate similarly.

The processor 211 executes this processing, based on the program stored in the ROM 212 or the auxiliary memory device 214 or the like.

The processor 211 receives a path request (ACT 51). In ACT 51, the processor 211 receives a path request transmitted from the server device 10 via the communication interface 215. It can also be said that the communication interface 215 receives the path request. The processor 211 performs the processing of ACT 51 and thus functions as a reception unit. The reception unit whose function is implemented by the processor 211 in ACT 51 is also referred to as a fourth reception unit.

If the processor 211 has not received a path request addressed to the local node as the destination (NO in ACT 51), the processor 211 waits for a path request addressed to the local node as the destination. In response to the reception of a path request addressed to another node as the destination, the processor 211 causes the path request addressed to the other node as the destination to hop by broadcasting.

In response to the reception of a path request addressed to the local node as the destination (YES in ACT 51), the processor 211 transmits a path response (ACT 52). In ACT 52, for example, the processor 211 transmits a path response including information about a communication path between the node 21 and the server device 10, via the communication interface 215. The transmission source address of the generated path response is the address of the node 21. The destination address of the path response is the address of the node 23. The start address of the path response is the address of the node 21. The end address of the path response is the address of the server device 10. The information about the communication path between the node 21 and the server device 10 includes the address of the node 21, which is the local node in this example. It can also be said that the communication interface 215 transmits the path response. The processor 211 performs the processing of ACT 52 and thus functions as a transmission unit. The transmission unit whose function is implemented by the processor 211 in ACT 52 is also referred to as a fourth transmission unit.

In the above example, each node transmits the information about the communication path between the node and the server device 10, as the response to the path request. However, the present disclosure is not limited thereto. The transmission of the path request by the server device 10 may be omitted. In this example, each node may transmit the information about the communication path between the node and the server device 10 to the server device 10, automatically at any arbitrary timing rather than in direct response to a path request from the server device 10. Thus, the server device 10 can gather the information about communication path to the server device 10 for each of the nodes 21 to 25 without transmitting a path request.

Figure 10:
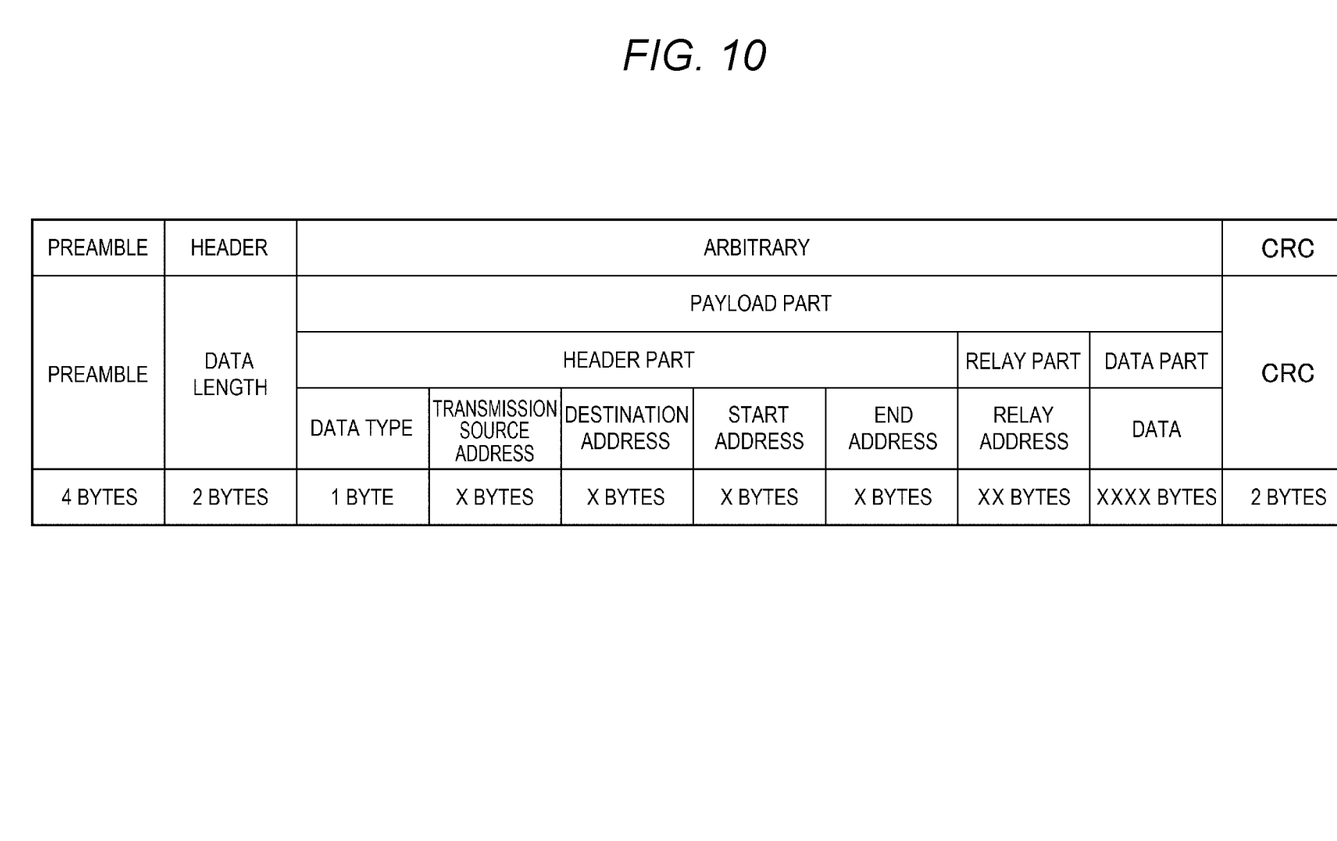
FIG. 10 shows an example of a packet used in the communication between a node and a server device.

FIG. 10 shows an example of a packet used in the communication between a node and the server device 10.

The packet includes a "header part," a "relay part," and a "data part" within a "payload part."

The header part includes a transmission source address, a destination address, a start address, and an end address.

The relay part includes a relay address. The relay address registers, in the relaying order, the address of one or more other nodes that relay the packet when the packet is transmitted from the server device 10 to the node. The relay address is used in downloading but is not used in uploading.

The data part suitably includes data to be transmitted.

A case where the server device 10 transmits a packet addressed to the node 21 as the destination will now be described.

The packet transmitted by the server device 10 is configured as follows.

The transmission source address is the address of the server device 10. The destination address is the address of the node 23. The start address is the address of the server device 10. The end address is the address of the node 21. The relay address is the address of the node 23.

The packet hopping via the node 23 is configured as follows. The transmission source address is the address of the node 23. The destination address is the address of the node 21. The start address is the address of the server device 10. The end address is the address of the node 21. The relay address is the address of the node 23.

A case where the node 21 transmits a packet addressed to the server device 10 as the destination will now be described.

The packet transmitted by the node 21 is configured as follows.

The transmission source address is the address of the node 21. The destination address is the address of the node 23. The start address is the address of the node 21. The end address is the address of the server device 10. No relay address is used.

According to this embodiment, each node registers the rank of the local node, based on an entry request transmitted from a server device. Each node registers a communication path between the local node and the server device, based on a rank response from one or more other nodes in response to a rank request transmitted thereto. Thus, the server device can easily construct a mesh network, based on the transmission of the entry request as the start point. For example, each node need not register the address of the server device before a mesh network is constructed. Therefore, even if the node is a device having no user interface, the construction of a mesh network due to a change of the server device can be easily done.

In the processor 11 and the processor 211, a part or the entirety of the processing implemented by a software program in an embodiment may be implemented by a hardware configuration of a circuit.

Each of the devices in the embodiment can transferred, for example, to a manager, an owner, or the like of each device in the state where a program for executing each piece of the foregoing processing is stored in the device. Alternatively, each of the devices can be transferred to the manager, the owner, or the like in the state in which the program is not yet stored in the device. The program may then be separately transferred to the manager, the owner, or the like and stored in each device based on an operation by the manager, the owner, a maintenance worker, or the like. The transfer of such a program can be implemented, for example, by using a removable memory medium such as a disk medium or a semiconductor memory, or by downloading via the internet or a LAN or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system, comprising:
a plurality of communication nodes; and
a server configured to:
store addresses for each of the plurality of communication nodes in a memory unit, and
broadcast a mesh network entry request to the plurality of communication nodes based on the addresses stored in the memory unit, wherein
each communication node is configured to:
receive the mesh network entry request,
cause a mesh network entry request to hop by broadcasting the mesh network entry request to the other communication nodes if a destination address of the mesh network entry request is not the address of the communication node itself,
register a rank of the communication node itself based on a number of hops required for a mesh network entry request to reach the communication node itself if a destination address of the mesh network entry request is the address of the communication node,
transmit a rank request based on the registration of the rank of the communication node itself,
receive a rank response from one or more of the other communication nodes in response to the transmitted rank request, each rank response from another one of the communication nodes including a rank of the particular communication node transmitting the rank response, and
register a communication node having a highest ranking rank response as a communication path to the server if the rank of the communication node sending the highest ranking rank response is higher than the rank of the communication node that transmitted the rank request.

2. The communication system according to claim 1, wherein the server is further configured to:
receive communication path information indicating a communication path between one of the communication nodes and the server; and
register the indicated communication path for the one of the communication nodes.

3. The communication system according to claim 2, wherein the server is further configured to:
transmit a request for communication path information to the plurality of communication nodes.

4. The communication system according to claim 1, wherein a least one of the plurality of communication nodes lacks a user interface permitting a user to enter an address of the server.

5. The communication system according to claim 4, wherein the address of the server is changeable.

6. The communication system according to claim 1, wherein at least one of the plurality of communication nodes is a printer.

7. A communication device, comprising:
a memory unit storing an address of the communication device itself; and
a communication interface configured to:
receive a mesh network entry request broadcast by a server; and
broadcast a mesh network entry request to other communication devices if a destination address of the received mesh network entry request is not the address of the communication device itself;
a controller configured to:
register a rank of the communication device itself in the memory unit based on a number of hops required for a mesh network entry request to reach the communication device if a destination address of the mesh network entry request is the address of the communication device itself;
control the communication interface to transmit a rank request based on the registration of the rank of the communication device itself;
receive a rank response, via the communication interface, from one or more other communication devices in response to the transmitted rank request, each rank response from another one of the communication devices including a rank of the particular communication device transmitting the rank response; and register a communication device having a highest ranking rank response as a communication path to the server if the rank of the communication device sending the highest ranking rank response is higher than the rank of the communication device sending the rank request.

8. The communication device according to claim 7, wherein the communication device lacks a user interface permitting a user to enter an address of the server.

9. The communication device according to claim 8, wherein the address of the server is changeable.

10. The communication device according to claim 7, wherein the communication device is a printer.

11. The communication device according to claim 7, wherein the communication device is a keyboard.

12. The communication device according to claim 7, wherein the communication interface is a wireless communication interface.

13. A communication method for establishing a mesh network, the method comprising:

broadcasting mesh network entry requests to a plurality of communication nodes from a server based on addresses of the plurality of communication nodes stored in a memory unit of the server;

receiving a mesh network entry request at a first communication node of the plurality of communication nodes and causing the mesh network entry request to hop to another communication node by broadcasting from the first communication node if a destination address of the mesh network entry request is not the address of the first communication node, and causing the first communication node to register a rank for the first communication node based on the number of hops by the mesh network entry request before reaching the first communication node if the destination address of the mesh network entry request is the first communication node itself;

transmitting a rank request from the first communication node if the first communication node registers the rank of the first communication device;

receiving a rank response from one or more other communication nodes in the plurality of communication at the first communication node in response to the rank request from the first communication node, each rank response including a rank of the other communication device transmitting the respective rank response; and registering a communication node other than the first communication node as a communication path to the server if the other communication node has a highest ranking rank response among the received rank responses and the rank of the other communication node is higher than the rank of the first communication node.

14. The communication method according to claim 13, further comprising:

at the server, receiving communication path information indicating a communication path between one of the communication nodes and the server; and registering, in the server, the indicated communication path for the one of the communication nodes.

15. The communication method according to claim 14, further comprising:

transmitting a request for communication path information to the plurality of communication nodes.

16. The communication method according to claim 13, wherein a least one of the plurality of communication nodes lacks a user interface permitting a user to enter an address of the server.

17. The communication method according to claim 16, wherein the address of the server is changeable.

18. The communication method according to claim 13, wherein at least one of the plurality of communication nodes is a printer.

* * * * *